United States Patent

[11] 3,586,179

[72] Inventors Samuel Pinnolis;
Wilhelm E. A. Schmidt, both of Winston-Salem, N.C.
[21] Appl. No. 877,573
[22] Filed Nov. 26, 1969
Division of Ser. No. 620,318, Mar. 3, 1967, Pat. No. 3,491,900
[45] Patented June 22, 1971
[73] Assignee Western Electric Company, Incorporated
New York, N.Y.

[54] APPARATUS FOR REMOVING AN ARTICLE CLAMPED IN A WORKHOLDER
4 Claims, 11 Drawing Figs.
[52] U.S. Cl. .................................................. 214/16 B, 214/1 BC
[51] Int. Cl. .................................................. B65g 1/04
[50] Field of Search .......................................... 214/16, 16 B, 16.4, 1 B

[56] References Cited
UNITED STATES PATENTS
3,124,232  3/1964  Homen ....................... 214/1
3,127,025  3/1964  Clark et al. ................. 214/1
3,179,261  4/1965  Matschke .................... 214/1 X
3,456,425  7/1969  Pezza ......................... 53/236

Primary Examiner—Gerald M. Forlenza
Assistant Examiner—Raymond B. Johnson
Attorneys—H. J. Winegar, R. P. Miller and S. Gundersen ABSTRACT: An apparatus opens clamping jaws on workholders mounted on a turret and then unloads articles held by resilient clamps on the workholder. A pair of open jaws are moved about an article held in a workholder and then closed while spring members bear against the article urging it against inner faces of the jaws. The jaws are withdrawn and opened to release the article into a bin which has a plurality of compartments and is indexed in synchronism with the turret so that articles removed from a particular workholder are always delivered to the same compartment of the receiving bin.

APPARATUS FOR REMOVING AN ARTICLE CLAMPED IN A WORKHOLDER

This application is a division of application Ser. No. 620,318, filed Mar. 3, 1967 now U.S. Pat. No. 3,491,900 granted Jan. 27, 1969.

BACKGROUND OF THE INVENTION

Sealed contact switches are fabricated by a multiple-station assembly machine having a plurality of assembly fixtures. The fixtures receive the components of a sealed contact switch, a glass sleeve and a pair of contacts having a paddle-shaped portion and a shank portion, from feeding units positioned at the first two stations of the machine. The sealed contact switch is then assembled by indexing the fixture through various assembly stations until the fixture holding a completed sealed contact switch reaches the final station. At this final station, an unloading apparatus is required to remove the completed sealed contact switch from the fixture and to reset the fixture for receiving another set of components.

In the prior art there exist devices for removing and transferring an article from an assembly machine which utilize a pair of relatively movable rigid jaws for clamping and holding the article as it is withdrawn from the machine. In the operation of the prior art devices, the rigid jaws are clamped about the article and exert a holding pressure on it. If the portion of the article upon which the holding pressure is exerted is fragile, for example the glass sleeve portion of a sealed contact switch, then the article may be easily damaged by an excessive holding pressure. In removing completed sealed contact switches from an assembly machine, the variation in diameter of the glass sleeve portions of the switches makes it difficult to control the magnitude of the holding pressure so that a uniform pressure is exerted by the jaws. Therefore, it is desirable to compensate for variations in the glass sleeve diameter by using an unloading device in which the glass sleeve is not clamped between a pair of rigid jaws.

In order to check the operation of a particular assembly fixture of an assembly machine, it is necessary to inspect the completed sealed contact switches fabricated by the particular fixture. Thus, an unloading apparatus which separates the completed sealed contact switches according to the fixture by which they are fabricated is desirable.

SUMMARY OF THE INVENTION

An object of the present invention is to provide a new and improved apparatus for removing articles that are releasably clamped by a plurality of workholders mounted on a conveyor which intermittently advances the workholders to an unloading station.

Another object of the invention resides in removing articles from a plurality of workholders mounted on an indexible turret and transferring the articles to a plurality of compartments, indexed in synchronism with the turret, so that articles removed from a particular workholder are always directed to the same receiving bin.

With these and other objects in view, the present invention contemplates an unloading mechanism which operates at one station of a multistation assembly machine, such as a machine for assembling sealed contact switches to withdraw a completed article, such as a sealed contact switch, from an assembly fixture of the machine. The apparatus includes a clamping device having a pair of unloading jaws and a pair of spring members extending from inner sides of the unloading jaws. The spring members are moved into contact with a completed article held within the fixture as the unloading jaws are closed about the article. At this time the unloading jaws are not in contact with the article. A hinged plate, pivotally mounted upon the unloading apparatus and supporting a pair of movable actuator members, operates before the unloading jaws are advanced to release portions of the article from the assembly fixture. The hinged plate pivots toward the fixture so that the actuator members mounted on the plate contact a pair of movable jaws of the assembly fixture to disengage extended portions of the completed article. Then facilities mounted on the plate operate to move the actuator members to advance the jaws away from the completed article to their initial positions on the assembly fixture. The unloading jaws are then retracted to withdraw the article from the fixture. As the loading jaws move into contact with the article, the spring members clamp the article against the unloading jaws. The unloading jaws are then positioned over a receiving chute, and when the unloading jaws are opened, the article drops into the chute and is directed to one compartment of a rotary receiving bin having a plurality of compartments. Each compartment corresponds to one fixture of the assembly machine and receives completed articles from only that one fixture.

BRIEF DESCRIPTION OF THE DRAWING

Other objects and advantages of the present invention will be come apparent upon consideration of the following detailed description in conjunction with the accompanying drawings, wherein.

DETAILED DESCRIPTION

Assembly Machine and Fixtures

Figure 1:
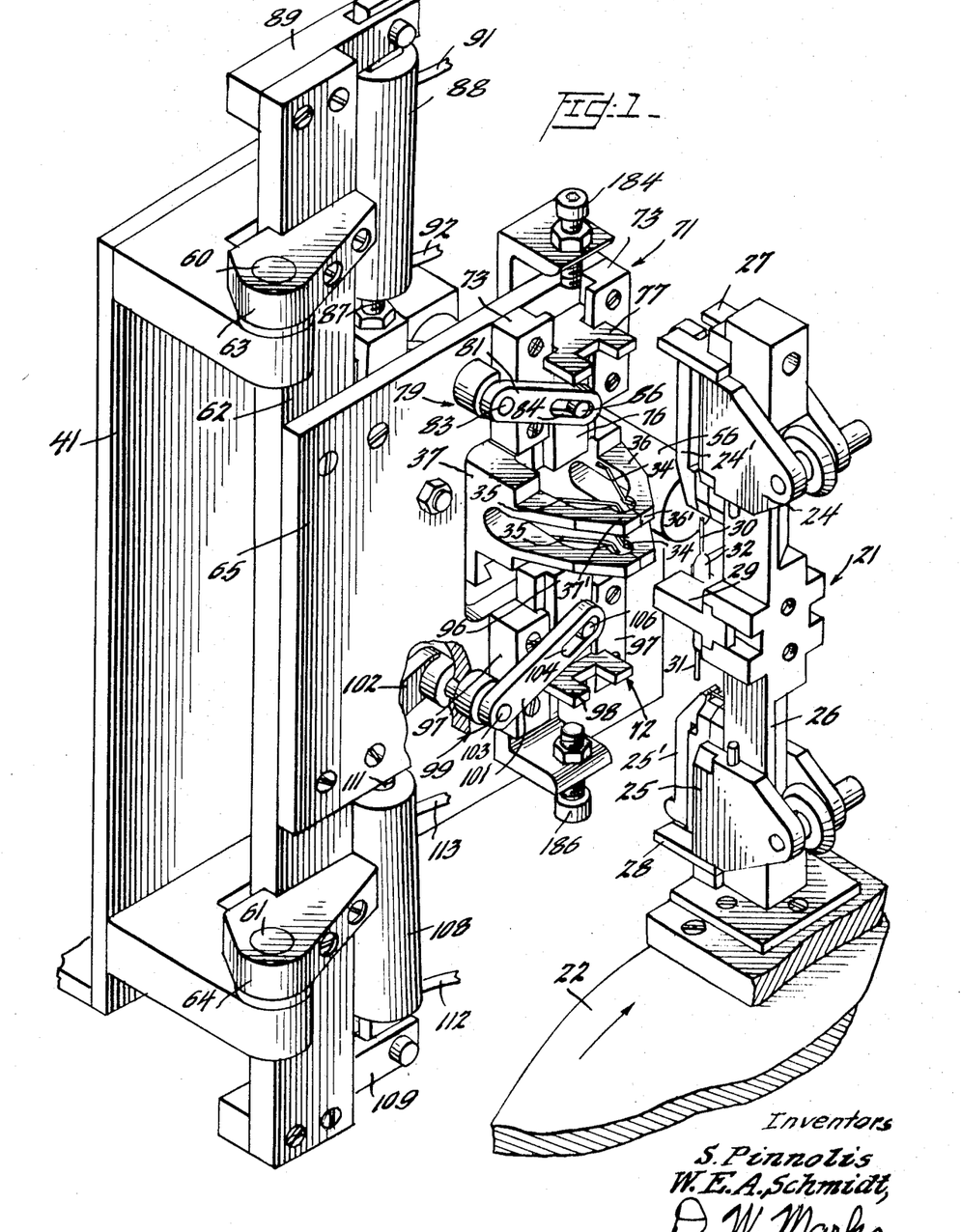
FIG. 1 is a perspective view of an apparatus for unloading completed articles from an assembly fixture embodying the principles of the present invention.

In FIG. 1 there is shown an unloading apparatus which is positioned at one station of an assembly machine having a plurality of stations at which assembly operations are performed. The assembly machine has a plurality of assembly fixtures 21 which are mounted upon the turret 22. The assembly machine is disclosed in detail in applications of this same date by J. C. McConnell, S. Pinnolis, and W. E. A. Schmidt entitled "Apparatus for Transferring Components of a Sealed Contact Switch to an Assembly Machine," and by G. A. Marlin, J. C. McConnell, and W. E. A. Schmidt entitled "Apparatus for Assembling Sealed Contact Switches." Each assembly fixture 21 includes an upper carriage 24 having a pivotal jaw member 24' and a lower carriage 25 having a pivotal jaw member 25' slidably mounted upon a standard 26. A plate 27 projects from the upper carriage 24 and a plate 28 projects from the lower carriage 25. A glass sleeve holder 29 is also mounted on the standard 26.

In the operation of the assembly machine, the turret 22 is indexed to advance the assembly fixtures 21 through a plurality of assembly stations. At the first station, the carriages 24 and 25 are moved to their extreme upper and lower positions, respectively, on the standard 26 and a loading mechanism operates to feed an upper contact 30 (FIGS. 1 and 2) to the carriage 24 and a lower contact 31 to the carriage 25. At the second station, another loading mechanism operates to feed a glass sleeve 32 into the holder 29 and the carriages 24 and 25 are then moved along the standard 26 toward the holder 29 to insert the contacts 30 and 31 into the glass sleeve 32 in an overlapping relationship. Thereafter, the fixtures 21 are advanced through assembly stations which first seal one end of the glass sleeve 32 and then set a desired gap between the overlapping portions of the contacts 30 and 31 before sealing the other end of the glass sleeve 32. The lower jaw member 25' is latched open during one of the assembly operations. When a fixture 21 arrives at the final station, a completed sealed contact switch is held therein by the upper carriage 24 and the holder 29. It is at this station that the unloading apparatus operates to release the completed switch from the fixture 21 and to reset the carriages 24 and 25 so that another pair of contacts can be inserted therein when the fixture 21 advances to the first station.

Unloading Apparatus

Figure 2:
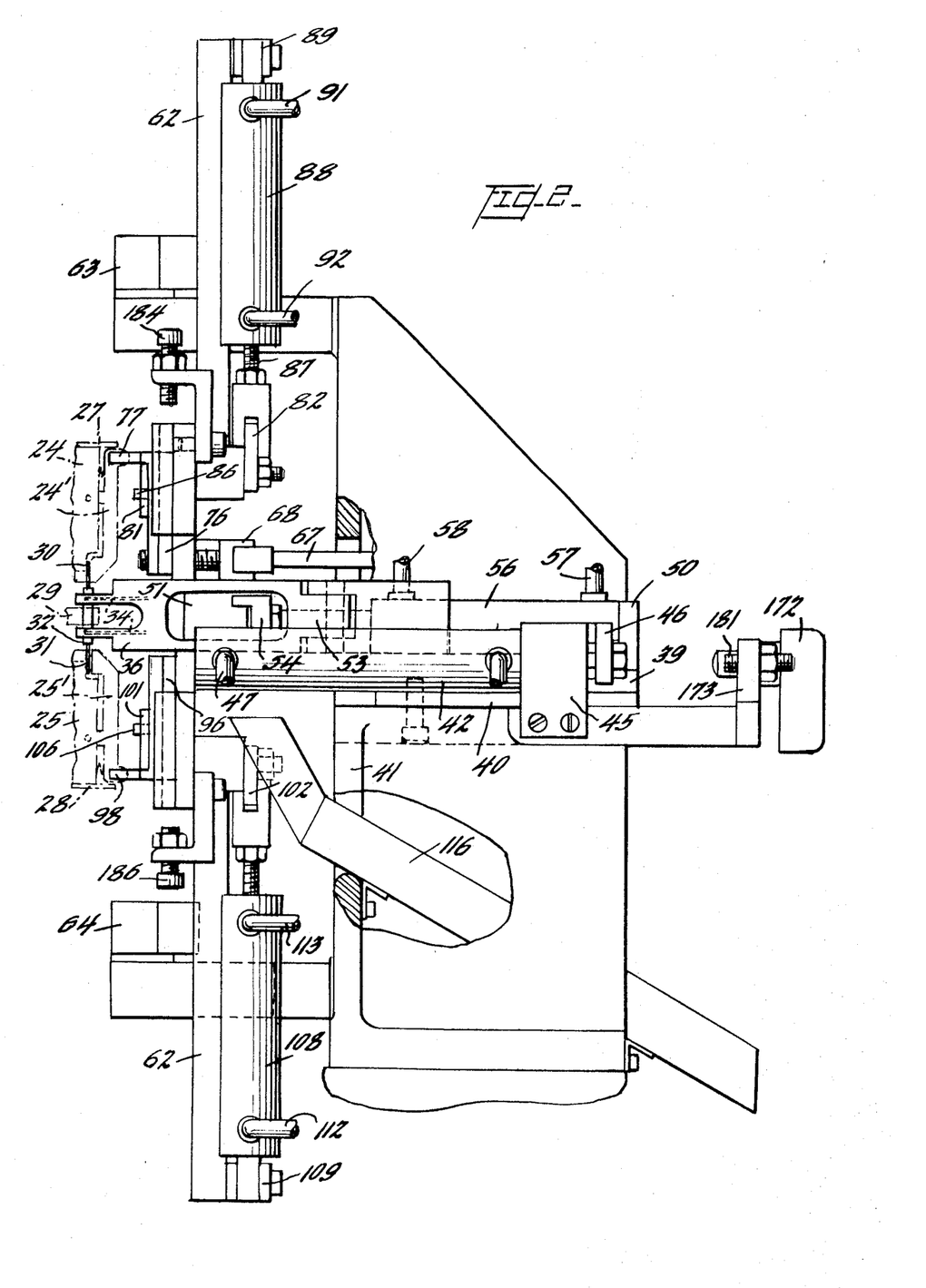
FIG. 2 is a side view of the unloading apparatus of FIG. 1 illustrating complete advancement of a pair of unloading jaws from a retracted position adjacent a receiving chute toward an assembly fixture holding a completed article.
Figure 3:
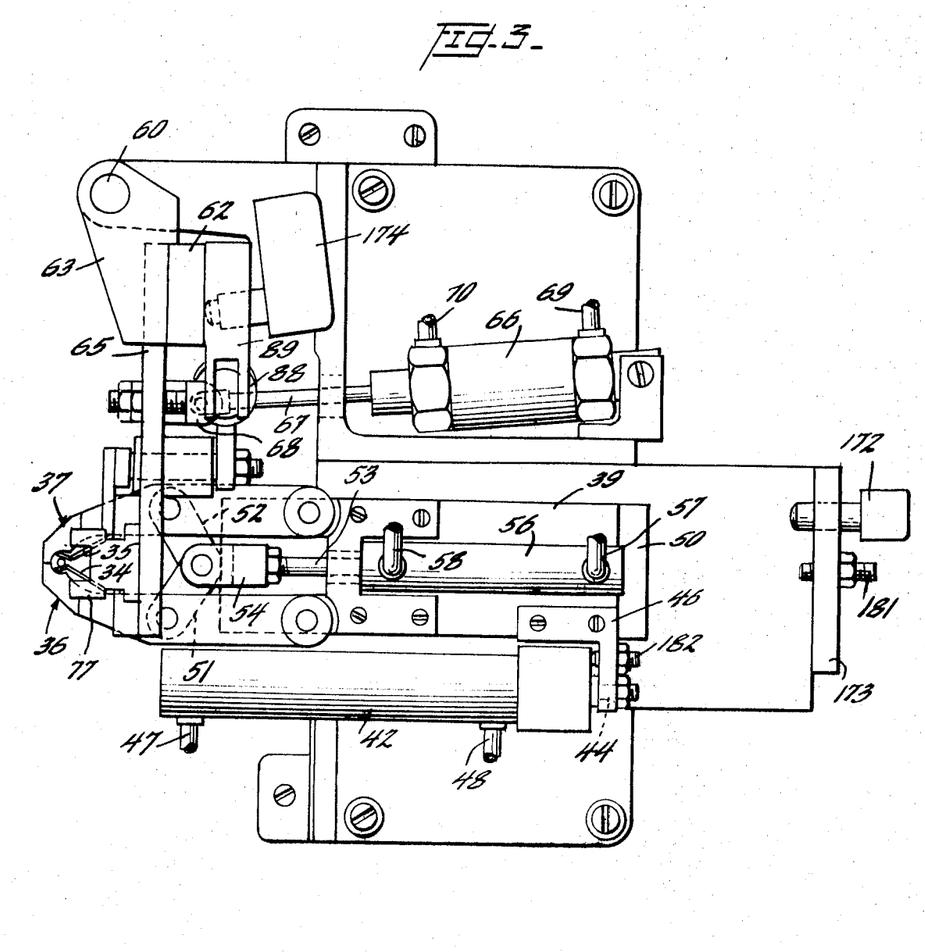
FIG. 3 is a plan view of the unloading apparatus of FIG. 1 illustrating a hinged plate which cooperates with the unloading jaws to release the completed article from the assembly fixture and to reset the assembly fixture for a subsequent assembly operation.
Figure 4:
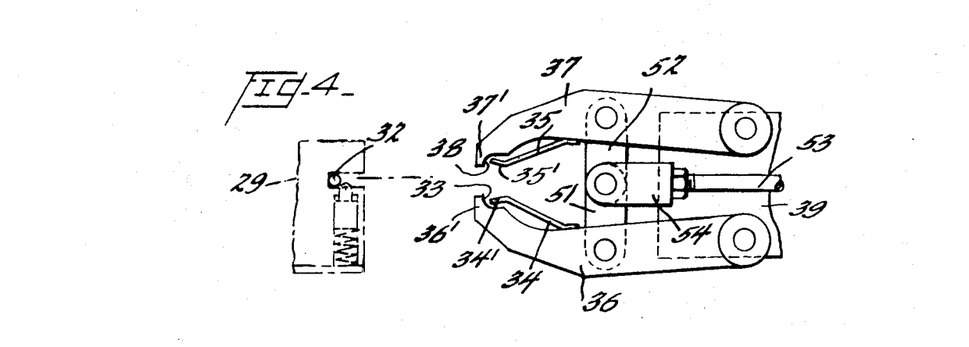
FIGS. 4—7 illustrate the operation of the unloading jaws and a pair of spring members which cooperate with the unloading jaws to remove an article from a workholder.

The unloading apparatus, as shown in FIGS. 1—4, includes a pair of unloading jaws 36 and 37, Each of the jaws 36 and 37 (FIGS. 3 and 4) has a pair of end sections 36' and 37' extending toward the end sections of the other jaw. The end sections 36' and 37' have curved inner surfaces 33 and 38 (FIG. 4) formed therein for contacting the glass sleeve 32 of a completed sealed contact switch. The jaws 36 and 37 are pivotally mounted to a slide 39 (FIGS. 2 and 3) which is slidably supported by a dovetail guide member 40 on a frame 41 of the assembly apparatus. Extending from the inner side of the unloading jaw 36 is a pair of spring members 34, shown in FIGS. 1—4, extending toward the end sections 36' of the jaw 36. Each of the spring members 34 has a flared end portion 34' (FIG. 4). Similarly, a pair of spring members 35, provided with flared end portions 35', is mounted to the inner side of the jaw 37. The flared portions 34' and 35' cooperate with the curved surfaces 33 and 38 of the unloading jaws 36 and 37 to clamp the glass sleeve 32 of the completed dry reed switch. An air cylinder 42, attached to the frame 41 by a bracket 45 (FIG. 2) adjacent to the slide 39, has a piston rod 44 (FIG. 3) extending therefrom and connected to the slide 39 by a bracket 46. A flexible hose 47 is connected to one end of the air cylinder 42 and another hose 48 is connected to the other end. Pressurized air is applied to the air cylinder 42 through the hoses 47 and 48 to move the slide 39 along the guide member 40 on the frame 41. The unloading jaws 36 and 37 are connected by a pair of links 51 and 52 to another link 54 mounted on a piston rod 53 extending from a second air cylinder 56. The air cylinder 56 is mounted on the slide 39 by a bracket 50. A flexible hose 57 is connected to one end of the air cylinder 56 and another hose 58 is connected to the other end. The jaws 36 and 37 are operated by applying pressurized air to the air cylinder 56 through the hoses 57 and 58.

Jaw Releasing Mechanism

Figure 8:
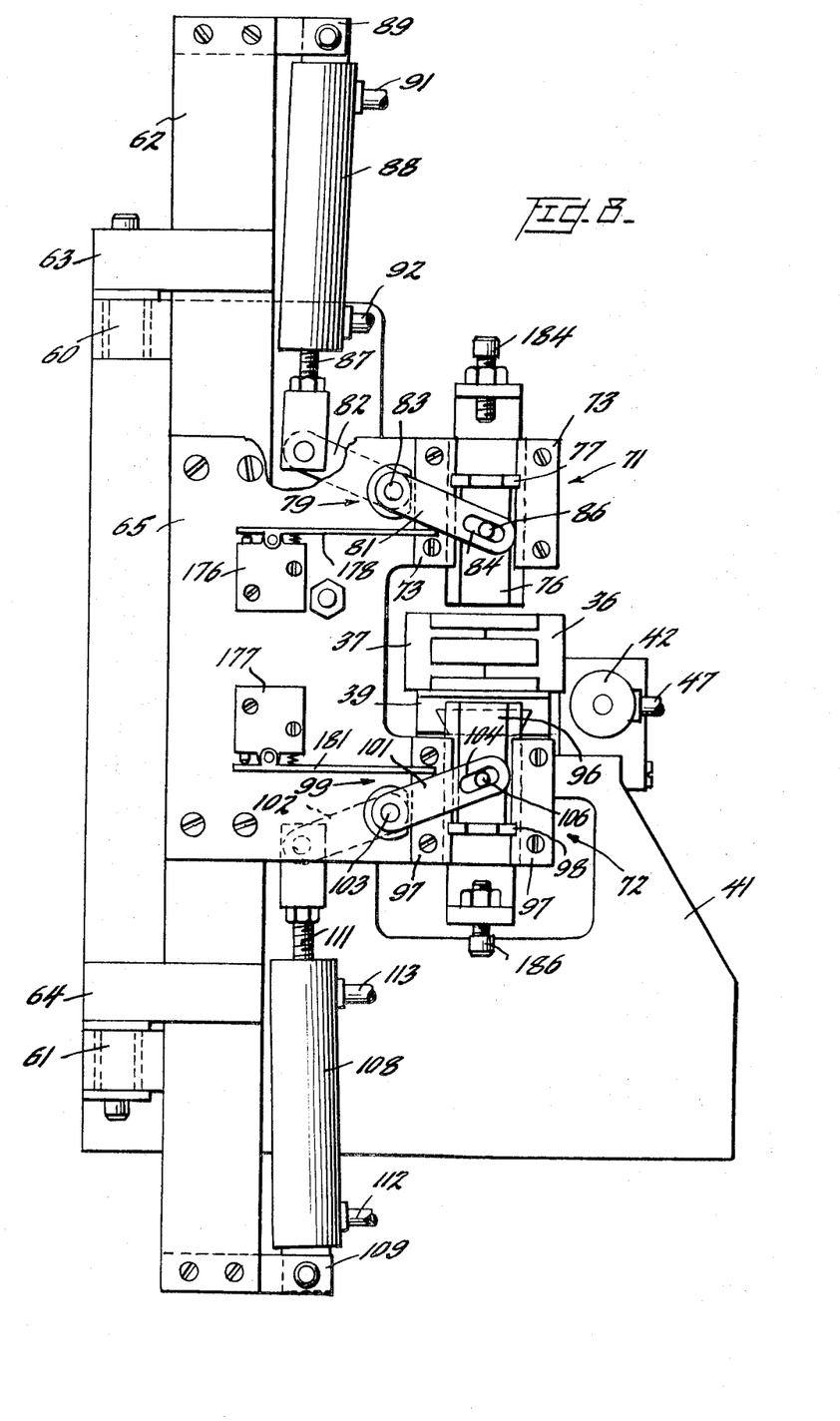
FIG. 8 is a front view of the unloading apparatus of FIG. 1 showing a pair of actuator members mounted on the hinged plate which open a pair of movable jaws on the assembly fixture and thereafter move the jaws away from the completed article.

The frame 41 supports a pair of bearing shafts 60 and 61 (FIGS. 1 and 8) to which a supporting member 62 is pivotally mounted by a pair of links 63 and 64. A plate 65 is attached to the supporting member 62 by a plurality of bolts so that the plate 65 and the member 62 pivot in hingelike fashion about the shafts 60 and 61. An air cylinder 66 (FIG. 3) attached to the frame 41 has a piston rod 67 extending therefrom which is attached to the plate 65 by a link 68. A flexible hose 69 is connected to one end of the air cylinder 66 and another hose 70 is connected to its other end. The plate 65 is pivoted toward and away from a fixture 21 by applying pressurized air to the air cylinder 66 through the hoses 69 and 70. The plate 65, which is generally rectangular in shape, has a cutout portion formed therein to provide a pair of extended portions 71 and 72 (FIGS. 1 and 8). A pair of guide members 73 are mounted on the extended portion 71 of the plate 65 in a parallel, spaced apart relationship.

An actuator member 76 is slidably mounted between the guide members 73 in dovetail fashion. The edges of the guide members 73, which contact the actuator member 76, are formed such that the actuator member 76 is confined therebetween and is limited to motion only in the vertical direction. The member 76 has a C-shaped projection 77 (FIGS. 1, 3 and 8) formed at its upper extremity which operates the upper carriage 24 of the fixture 21. A crank member 79 having two arms 81 and 82 extending in opposite directions from a central shaft section 83 is pivotally mounted to the plate 65 through an opening therein such that the arm 81 is positioned on the same side of the plate 65 as the actuator member 76 and the arm 82 is positioned on the opposite side. A elongated slot 84 is formed in the arm 81. A pin 86 extends from the actuator member 76 into the slot 84. The arm 82 is connected to a piston rod 87 extending from an air cylinder 88 which is mounted to a bracket 89 projecting from the member 62. A flexible hose 91 is connected at one end of the air cylinder 88 and another hose 92 is connected at its other end. By applying pressurized air to the air cylinder 88, the crank member 79 can be pivoted about its shaft section 83 to move the actuator member 76 vertically between the guide members 73.

An actuator member 96 is similarly mounted between a pair of guide members 97 on the extended portion 72 of the plate 65. The actuator member 96 also has a C-shaped projection 98, extending from its lower extremity, for operating the lower carriage 25 of the fixture 21. A crank member 99 having two arms 101 and 102 extending in opposite directions from a shaft section 103 is pivotally mounted to the plate 65 adjacent to the actuator member 96. An elongated slot 104 is formed in the arm 101. A pin 106 extends from the actuator member 96 into the slot 104. An air cylinder 108 mounted on a bracket 109 projecting from the member 62 has a piston rod 111 extending therefrom which is connected to the crank arm 102. A pair of flexible hoses 112 and 113 are connected at opposite ends of the air cylinder 108. By applying pressurized air through the hoses 112 and 113 to the air cylinder 108, the actuator member 96 can be moved vertically between the guide members 97.

Chute and Multiple Receiving Bin

The frame 41 also supports a chute 116 (FIG. 2) into which a completed article is released when the jaws 36 and 37 are opened by operation of the air cylinder 56. The chute 116 is positioned beneath the jaws 36 and 37 such that when the jaws 36 and 37 are in their fully retracted position on the frame 41, a completed article held therebetween is located directly above the chute 116.

Figure 9:
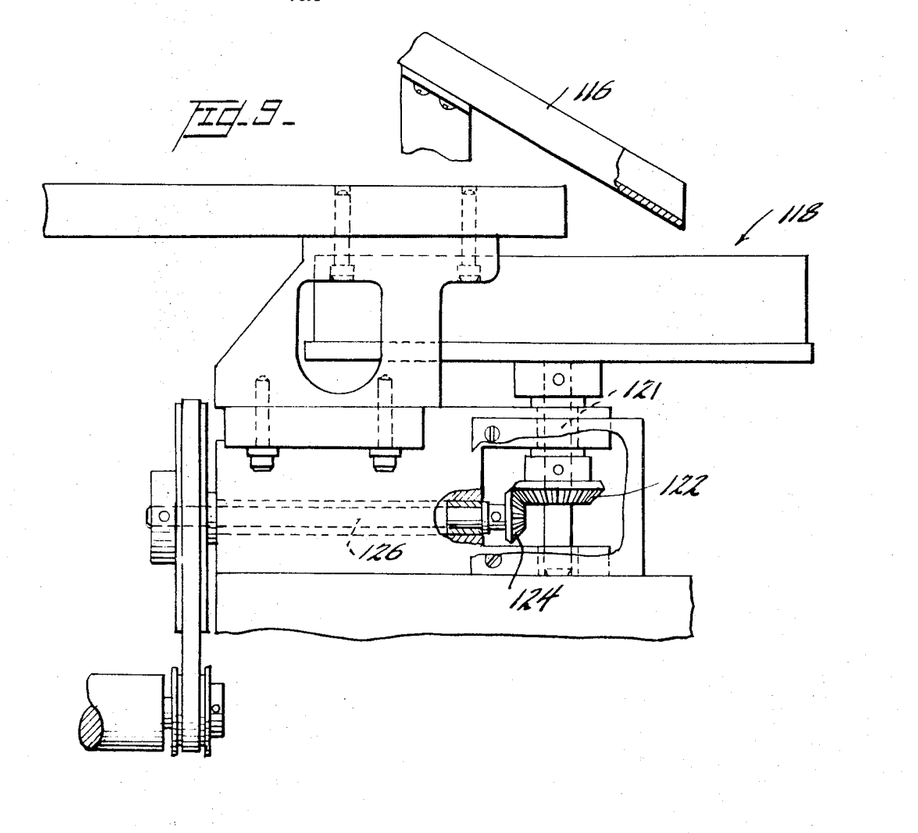
FIGS. 9 and 10 illustrate a rotary receiving bin having a plurality of compartments, each compartment corresponding to one assembly fixture on the assembly machine, for receiving completed articles after they are released from the unloading jaws into the receiving chute.
Figure 10:
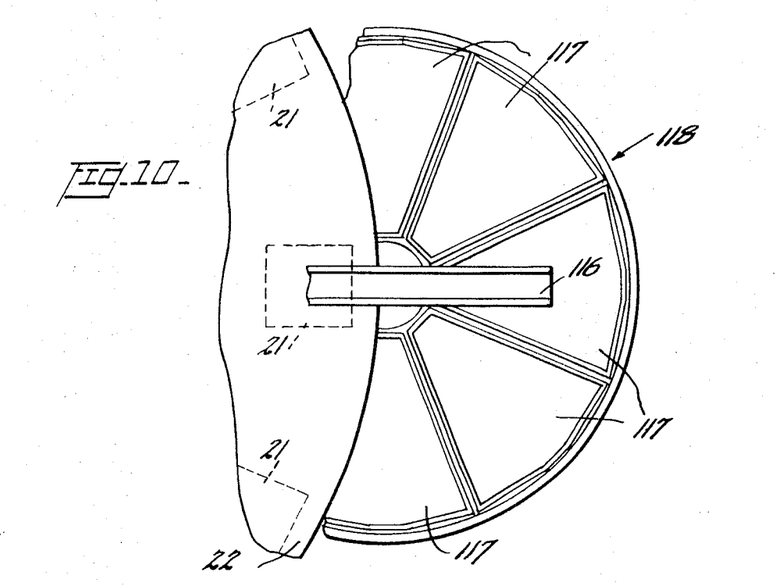

As shown in FIG. 10, the chute 116 terminates over one compartment 117 of a multicompartment rotary bin 118. The number of compartments 117 of the rotary bin 118 is equal to the number of assembly fixtures 21 of the turret 22. The bin 118 is mounted upon a shaft 121 (FIG. 9) to which a beveled gear 122 is attached. The beveled gear 122 meshes with another beveled gear 124 mounted on a drive shaft 126. The drive shaft 126 is rotated by the indexing mechanism for the turret 22. Thus, as an assembly fixture 21 is advanced to the unloading station by incremental rotation of the turret 22, a corresponding compartment 117 of the bin 118 is moved into registration with the end of the chute 116. As a result, each of the compartments 117 receives completed articles from only one of the assembly fixtures 21.

Control Circuit

Figure 11:
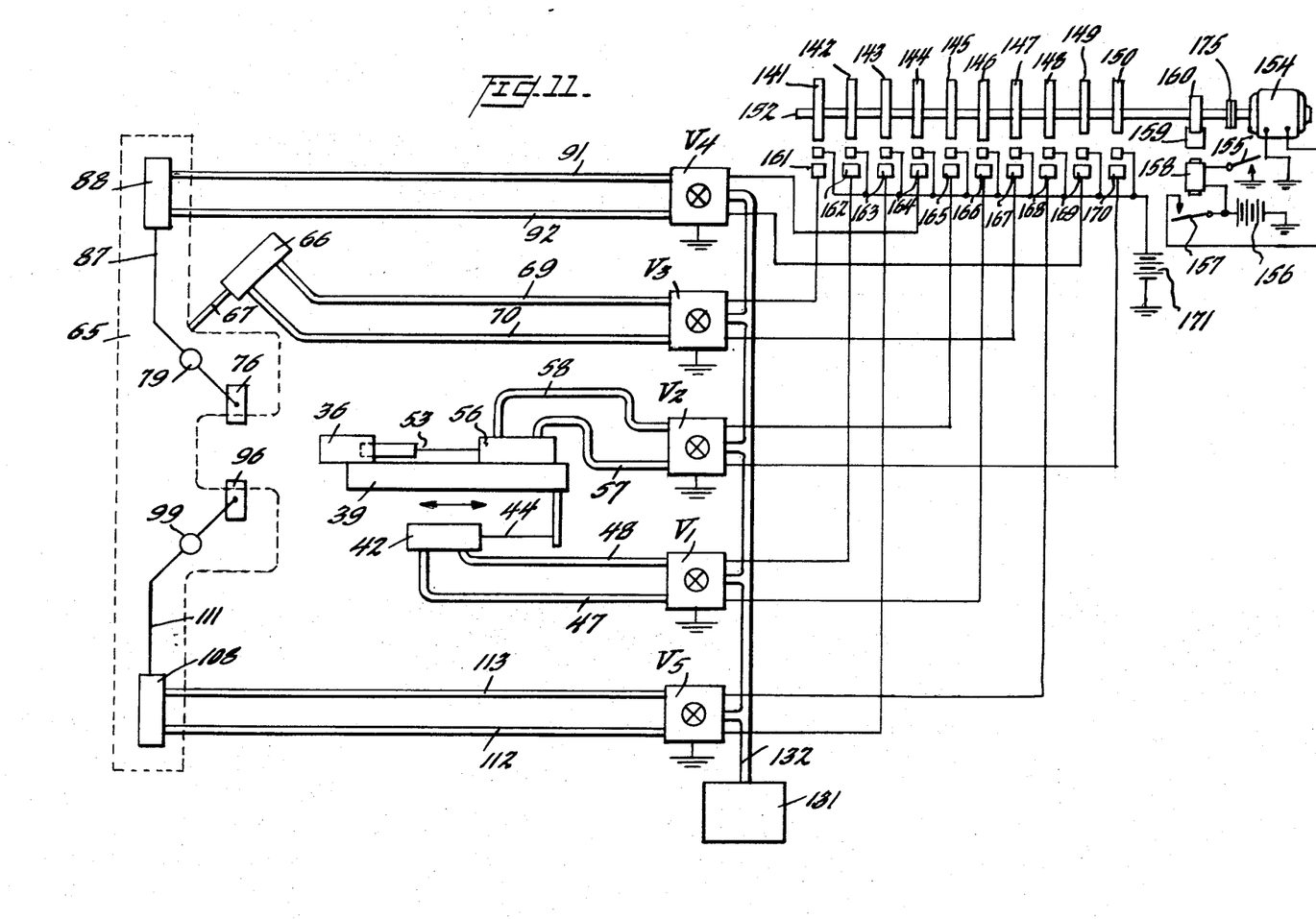
FIG. 11 is a schematic diagram of a circuit utilizing a plurality of four-way valves to supply pressurized air to a plurality of air cylinders which operate the unloading jaws, the hinged plate, and the actuator members of the unloading apparatus.

A circuit having a plurality of four-way valves $V_1$—$V_5$ (FIG. 11) is utilized to operate the unloading apparatus of the present invention. As shown in FIG. 11, the valves $V_1$—$V_5$ are connected to a source 131 of pressurized air through a common line 132. The output lines of valve $V_1$ are connected to the flexible hoses 47 and 48 of air cylinder 42 which operates the slide 39. The output lines of valve $V_2$ are connected to the flexible hoses 57 and 58 extending from the air cylinder 56 which operates the unloading jaws 36 and 37. The flexible hoses 69 and 70, attached to the air cylinder 66 which operates the hinged plate 65, are connected to the output lines of the valve $V_3$. The output lines of valve $V_4$ are connected to the flexible hoses 91 and 92 of the air cylinder 88 for operating the upper actuator member 76, and similarly, valve $V_5$ is connected to the flexible hoses 112 and 113 of air cylinder 108 for operating the lower actuator member 96.

The operation of the valves $V_1$—$V_5$ is controlled by a plurality of cams 141—150 mounted upon a shaft 152 which is rotated by a timing motor 154. The motor 154 is connected to a single cycle timing circuit which includes a switch 155, a potential source 156, and a switch 157 operated by a solenoid 158. The switch 155 is operated by the indexing mechanism of the turret 22 so that the motor 154 is energized during a dwell portion of the turret cycle. The solenoid 158 also operates a latch 159 which cooperates with a notched wheel 160, mounted on the shaft 152, to limit the rotation of the shaft 152 to one revolution. A slip clutch 175 is mounted on the shaft 152 to compensate for overrun of the timing motor 154.

The cams 141—150 operate a plurality of switches 161—170 through which an operating potential is applied to the valves $V_1$—$V_5$ by a source 171. The angular positions of the cams 141—150 relative to the shaft 152 are adjustable so that any desired sequence of operation of the switch 161—170 can be obtained by setting the cams 141—150 at desired angular positions.

Operation

In the operation of the present invention, after the turret 22 has been indexed to advance an assembly fixture 21 holding a completed article to a position adjacent to the unloading apparatus (FIG. 1), the switch 155 (FIG. 11), is momentarily closed to operate the solenoid 158 which closes the switch 157 to energize the motor 154. The solenoid 158 also moves the latch 159 out of a notch in the wheel 160 to allow the shaft 152 to rotate. The motor 154 rotates the shaft 152 and the cams 141—150 mounted thereon. The cam 141 is angularly positioned on the shaft 152 so that it is first to operate its associated switch 161. Upon the closing of the switch 161, the valve $V_3$ is operated such that pressurized air is applied from the source 131 through the valve $V_3$ to the flexible hose 69 to operate the air cylinder 66. The pressurized air applied to the cylinder 66 through the hose 69 moves the piston rod 67 outward from the cylinder 66 to pivot the hinged plate 65 toward the assembly fixture 21. The plate 65 pivots until the projections 77 and 98 of the actuator members 76 and 96 move into contact with the jaw members 24' and 25' of the fixture 21 (FIG. 2). By contacting the jaw members 24' and 25', the actuator members 76 and 96 bias the jaw members 24' and 25' into open positions to disengage the extended portions of a completed sealed contact switch. The jaw members 24' and 25' are maintained in their open positions so long as the plate 65 is held in its pivoted position by applying pressurized air to the cylinder 66 through the hose 69.

As the shaft 152 continues to rotate, the cam 142 is next to operate its associated switch 162 to energize the valve $V_1$ such that pressurized air from the source 131 is applied to the air cylinder 42 through the flexible hose 48. The pressurized air applied to the cylinder 42 draws the piston rod 44 into the cylinder 42 to advance the slide 39 and the unloading jaws 36 and 37 from an initial position (FIG. 4) toward the assembly fixture 21. At this time, the unloading jaws 36 and 37 are held in an open position by the air cylinder 56. At the same time, the cam 143 closes the switch 163 to operate the valve $V_5$ to apply pressurized air to the air cylinder 108 through the flexible hose 112. The pressurized air moves the piston rod 111 outward from the air cylinder 108 to pivot the crank member 99 in a clockwise direction (FIGS. 1 and 8) to move the actuator member 96 in a vertically downward direction. The projection 98 of the actuator member 96 contacts the plate 28 projecting from the lower carriage 25 and moves the carriage 25 downward along the standard 26.

A short time thereafter, the cam 144 closes switch 164 to energize valve $V_4$ to apply pressurized air to the air cylinder 88 through the flexible hose 91. The piston rod 87 of the cylinder 88 is thereby moved outward from the cylinder 88 to pivot the crank member 79 in a counterclockwise direction to move the actuator member 76 in a upward direction. The projection 77 of the actuator member 79 contacts the plate 27 projecting from the upper carriage 24 and moves the carriage 24 upward along the standard 26. It should be noted that the slide 39 and the unloading jaws 36 and 37 begin to move toward the fixture 21 before the actuator members 76 and 96 are moved. This is accomplished by adjusting the cams 142, 143, and 144 to desired angular positions so that the movement of the slide 39 and actuator members 76 and 96 overlap in time in order to reduce the time required for the unloading apparatus to operate.

Figure 5:
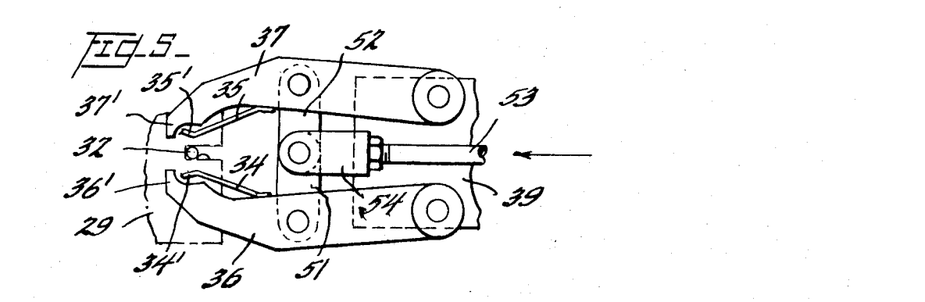
Figure 6:
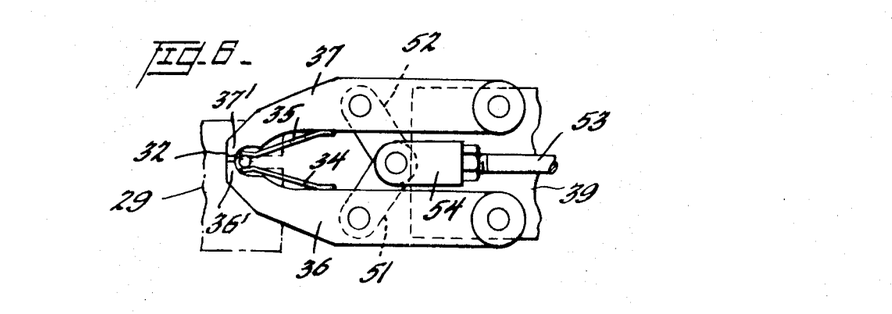

The slide 39 continues to move toward the fixture 21 and, as shown in FIG. 5, the end sections 36' and 37' of the jaws 36 and 37 are moved past the glass sleeve 32 held in the holder 29. At the same time the flared portions 34' and 35' of the spring members 34 and 35 are moved adjacent to the glass sleeve 32. When the piston rod 44 is moved completely into the air cylinder 42, the slide 39 is moved to its extreme extended position (FIGS. 2 and 5) relative to the frame 41 of the unloading apparatus. Then the switch 165 is closed by the cam 145 to operate the valve $V_2$. Pressurized air from the source 131 is applied through the valve $V_2$ and the flexible hose 58 to the air cylinder 56 to draw the piston rod 53 into the cylinder 56. The unloading jaws 36 and 37 are operated by the piston rod 53 through the links 51 and 52, and movement of the piston rod 53 into the cylinder 56 closes the jaws 36 and 37 such that the end sections 36' and 37' of the jaws 36 and 37 are moved behind the glass sleeve 32 held in the holder 29 of the fixture 21. As the jaws 36 and 37 are closed, the flared spring portions 34' and 35' are moved into contact with the front of the glass sleeve 32 and the spring members 34 and 35 are biased outwardly in a slightly separated position as shown in FIG. 6. The jaws 36 and 37 are held in a closed position so long as pressurized air is applied to the air cylinder 56 through the hose 58.

Figure 7:
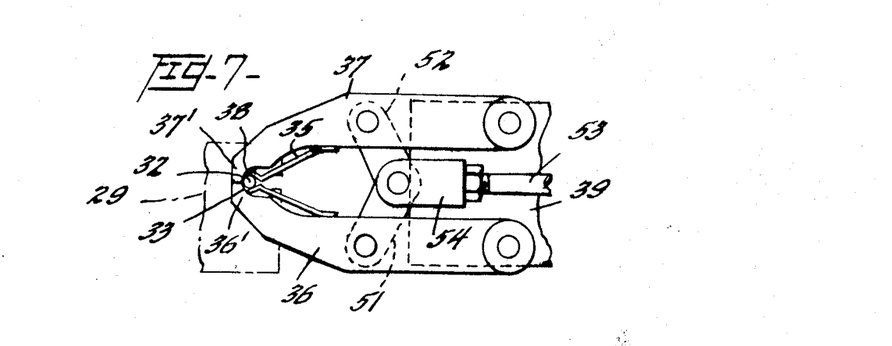

After the jaws 36 and 37 are closed, the cam 146 closes the switch 166 to operate the valve $V_1$ which controls the motion of the slide 39. The two-way valve $V_1$ is switched so that pressurized air from the source 131 is directed through the valve $V_1$ to the flexible hose 47. When pressurized air is applied to the air cylinder 42 through the hose 47, the piston rod 44 is moved outward from the cylinder 42 to move the slide 39 toward its fully retracted position on the frame 41. As the slide 39 is retracted, the curved inner surfaces 33 and 38 of the jaws 36 and 37 are brought into contact with the glass sleeve 32 (FIG. 7). Continued movement of the slide 39 and the jaws 36 and 37 withdraws the completed sealed contact switch from the holder 29 of the fixture 21. At the same time, the spring members 34 and 35 tend to close together to hold the glass sleeve 32 of the switch against the curved portions 33 and 38 of the jaws 36 and 37.

As the slide 39 is moved away from the fixture 21, the cam 147 closes its associated switch 167 to switch the valve $V_3$ so that pressurized air is applied to the air cylinder 66 through the flexible hose 70. As a result, the piston rod 67 is drawn into the cylinder 66 and the hinged plate 65 is pivoted away from the fixture 21 to its initial position on the frame 41.

Then the cam 148 closes the switch 168 to switch the valve $V_5$ so that pressurized air is applied to the air cylinder 108 through the flexible hose 113. The piston rod 111 is drawn into the cylinder 108 and pivots the crank member 99 in a counterclockwise direction to move the actuator member 96 to its initial position on the plate 65. Next the cam 149 operates the switch 169 to switch the valve $V_4$. The valve $V_4$ then directs pressurized air through the flexible hose 92 to the air cylinder 88. The piston rod 86 is drawn into the cylinder 88 and pivots the crank member 79 in a clockwise direction (FIG. 8) to move the actuator member 76 to its initial position on the plate 65.

Finally, after the slide 39 and the jaws 36 and 37 are completely retracted from the fixture 21, the cam 150 operates its associated switch 170 to switch the valve $V_2$ so that pressurized air is applied to the air cylinder 56 through the flexible hose 57 to open the jaws 36 and 37. When the jaws 36 and 37 are opened, the completed switch is released. The switch drops into the chute 116 and is directed to a compartment 117 of the rotary bin 118 which is in registration with the end of the chute 116. At this point the latch 159 moves into the notch in the wheel 160 to prevent further rotation of the shaft 152. The solenoid 158 and the motor 154 are deenergized and the unloading operation is concluded.

It should be noted that at the conclusion of the unloading cycle, the components of the unloading apparatus are located in their initial positions. The slide 39 is in its fully retracted position on the frame 41 and the unloading jaws 36 and 37 are held open by the air cylinder 56. The plate 65 is pivoted away from the fixture 21 and the actuator members 76 and 96 are in their initial positions on the plate 65. Thus, the unloading apparatus in prepared for the initiation of a subsequent unloading cycle immediately after the previous cycle is completed.

In addition, it should be noted that the assembly fixture 21 is reset by the unloading apparatus so that the carriages 24 and 25 of the fixture 21 are in the proper positions to receive a new set of contacts when the fixture 21 is advanced to the first assembly station.

To initiate another unloading operation, the turret 22 is indexed to advance another fixture 21 to the unloading station. At the same time, the rotary bin 118 is also indexed to advance another compartment 117 into registration with the end of the chute 116. The switch 158 is then closed to start the unloading cycle and the unloading cycle and the unloading operation described above is repeated.

Each compartment 117 of the rotary bin 118 (FIG. 10) corresponds to a particular fixture 21 on the turret 22. When a particular fixture 21 is advanced to the unloading station, its corresponding compartment 117 is moved into registration with the chute 116. When the unloading apparatus is operated, the completed article held in the fixture 21 is delivered to its corresponding compartment 117. Since each compartment 117 receives complete articles from only one assembly fixture 21, the operation of any fixture 21 may be checked by inspecting the articles delivered to its corresponding compartment 117.

The unloading apparatus is provided with a plurality of microswitches which operate circuits designed to prevent damage to the unloading apparatus and the assembly machine. A microswitch 17 (FIGS. 2 and 3) is mounted on a support 173 extending from the frame 41. The microswitch 172 is operated by the slide 39 when it is in its completely retracted position. The microswitch 172 operates a circuit (not shown) for controlling the operation of the indexing mechanism for the turret 22. When the slide 39 and the unloading jaws 36 and 37 are extended from the unloading apparatus toward the fixture 21, the microswitch 172 is unoperated and its associated circuit prevents the turret indexing mechanism from operating. Only when the slide 39 is returned to its retracted position on the frame 41 to close the microswitch 172 can the turret 22 be advanced. Another microswitch 174 (FIG. 3) is mounted on the frame 41 adjacent to the plate 65. The microswitch 174 also operates a circuit (not shown) for controlling the turret indexing mechanism so that when the plate 65 in pivoted toward the assembly fixture 21 the turret 22 cannot be advanced.

A pair of microswitches 176 and 177 (FIG. 8) is mounted on the plate 65 adjacent to the actuator members 76 and 96.

An operating lever 178 is pivotally mounted to the microswitch 176 and is spring-biased against the arm 81 of the crank member 79. Rotation of the crank member 79 operates the microswitch 176 through the lever 178 such that when the actuator member 76 is in its initial position on the plate 65, the microswitch 176 is unoperated. The microswitch 176 controls an inhibiting circuit (not shown) which prevents the turret indexing mechanism from operating until the actuator member 76 is located in its initial position. Similarly, a microswitch 179 having an operating lever 181 is mounted on the plate 65 adjacent to the actuator member 96. The microswitch 179 is operated by the arm 101 of the crank member 99 and controls an inhibiting circuit (not shown) which prevents the turret 22 from indexing until the actuator member 96 is returned to its initial position on the plate 65.

As noted above, the operating sequence of the unloading apparatus is controlled by the cams 141—150 and associated switches 161—170. The sequence can be varied by adjusting the angular positions of the cams 141—150 on the shaft 152. In order to reduce the time required for an unloading cycle, it is desirable to adjust the cams 141—150 so that particular functions of the apparatus can be started before the completion of previously initiated functions. For example, pressurized air is applied to the cylinder 56 to advance the slide 39 and the unloading jaws 36 and 37 toward the assembly fixture 21 before the actuator members 76 and 79 are moved to separate the carriages 24 and 25 of the fixture 21. By similar overlapping of the other functions of the unloading apparatus, the time required for an operating cycle to be completed can be minimized.

The unloading apparatus is also provided with a plurality of adjustable stops for limiting the motion of the moving parts of the apparatus. As shown in FIG. 3, a bolt 181 mounted in the support 173 and a bolt 182 mounted in the bracket 46 are used to determine the completely retracted and the completely extended positions of the slide 39. In addition, a pair of bolts 184 and 186 (FIGS. 1, 3 and 8) are used to determine the extent of upward and downward motion, respectively, of the upper actuator member 76 and the lower actuator member 96.

The above-described unloading apparatus is an embodiment of the present invention which illustrates the principles of the invention. The apparatus is not limited to use with a sealed contact switch fabricating machine. Modifications in the apparatus and its operating cycle can be made by persons having ordinary skill in the art without departing from the scope of the present invention.

What we claim is:

1. In an apparatus for removing articles that are releasably clamped by a plurality of workholders mounted on a conveyor which intermittently advances the workholders to an unloading station:

a movable receiving bin located at the unloading station having a plurality of compartments, each compartment thereof corresponding to a particular workholder mounted on the conveyor, a transfer device located at the unloading station for gripping and removing an article from a workholder which is positioned at said station and for directing said article to a compartment of said receiving bin, means for indexing said movable receiving bin in synchronism with said conveyor to position a compartment thereof adjacent to said transfer device, and means rendered operative upon the removal of said article from said workholder for releasing said gripped article from said transfer device whereupon said released article is directed into said compartment.

2. In an apparatus for removing articles that are resiliently clamped by a plurality of workholders mounted upon an intermittently moved conveyor:

clamping means having a pair of relatively movable jaws, each of said jaws having an end section extending toward the end section of the other jaw, and resilient members projecting from inner sides of said jaws and spaced from inner sides of said jaw end sections, a movable receiving bin having a plurality of compartments, each compartment thereof corresponding to a particular workholder mounted on the conveyor, a chute position beneath said clamping means, one end thereof located beneath said movable jaws and its other end terminating over said receiving bin, means for indexing said movable receiving bin in synchronism with said conveyor to position a compartment thereof in registration with said chute, means rendered operative upon said indexing of said receiving bin and conveyor for reciprocating said clamping means from an initial position spaced from said conveyor toward a workholder to move said jaw end sections past said article, means rendered effective upon movement of said jaw end section past said article for closing said movable jaws to move said resilient device into contact with one side of said article and to move said jaw end sections behind an opposite side of said article whereafter the return of said clamping means to its initial position moves said end sections to contact said article to withdraw said article from said workholder and said article is held against said inner sides of said jaw end sections by said resilient device, and means rendered operative upon the return of said clamping means to its initial position for opening said jaws to release said article into said chute whereupon it is directed to said compartment in registration with said chute.

3. In an apparatus positioned at an unloading station of a multistation assembly machine for removing articles from releasable workholders mounted on an indexible turret:

a slide, a pair of relatively movable jaws mounted on said slide, each of said jaws having an end section extending toward the end section of the other jaw, spring members extending from inner sides of said jaws having end portions flared outwardly from one another and spaced from inner sides of said jaw sections, a conveyor located adjacent to said turret having a plurality of receiving bins mounted thereon, a chute positioned beneath said slide and said jaws and terminating over said conveyor, means for indexing said conveyor in synchronism with said turret to move a receiving bin on said conveyor into registration with said chute and to advance a workholder to the unloading station and adjacent to said jaws, means rendered effective upon said indexing of said turret for reciprocating said slide from an initial position spaced from said turret toward said workholder to move said end sections of said jaws part said article, means rendered effective upon movement of said jaw end sections past said article for closing said jaws to move said flared ends of said spring members into contact with one side of said article and to move said end sections behind an opposite side of said article whereafter the return of said slide to its initial position moves said end sections to contact said article to withdraw said article from said workholder and said article is held against said inner sides of said jaw end sections by said spring members, and means rendered effective upon the return of said slide to its initial position for opening said jaws to release said article into said chute whereupon it is directed to said registered receiving bin.

4. In an apparatus for removing articles that are resiliently clamped by a plurality of workholders mounted on a first conveyor which intermittently advances the workholders to an unloading station:

a slide, a pair of normally open jaws pivotally mounted on said slide, each of said jaws having an end section extending toward the end section of the other jaw, spring members extending from inner sides of said jaws having end portions flared outwardly from one another and spaced from inner sides of said jaw end sections, means for advancing said slide from an initial position toward said workholder to move said end sections of said jaws past said article, means rendered effective upon said end sections of said jaws moving past said article for closing said jaws to move said flared portions of said spring members into contact with one side of said article and to move said jaw end sections behind an opposite side of said article, means rendered operative upon closing of said jaws for retracting said slide from said workholder to move said inner sides of said jaw end sections into engagement with said article to remove said article from said workholder whereupon said article is held against said inner sides by said flared ends of said spring members as said slide returns to its initial position, a second conveyor located adjacent to said first conveyor having a plurality of receiving bins mounted thereon, a chute positioned beneath the jaws and terminating over said second conveyor, means for indexing said first and second conveyors in synchronism to move a receiving bin of said second conveyor into registration with said chute and to advance a workholder of said first conveyor to the unloading station, and means rendered effective upon the retraction of said jaws from said workholder back to their initial position for opening said jaws to release an article held thereby into said chute whereupon it is directed to said registered receiving bin.